United States Patent [19]

Lee

[11] 4,339,226
[45] Jul. 13, 1982

[54] MULTIPLE-PURPOSE CLOSED LOOP AUTOMATIC CONTROL SYSTEM

[76] Inventor: Yu-Kuang Lee, No. 596, Chung Cheng Rd., Chu Pei, Hsin Chu Hsien, Taiwan

[21] Appl. No.: 188,468

[22] Filed: Sep. 18, 1980

Related U.S. Application Data

[62] Division of Ser. No. 823,462, Aug. 10, 1977, Pat. No. 4,250,440.

[51] Int. Cl.$^3$ .............................................. F01D 17/06
[52] U.S. Cl. ........................................ 415/15; 415/18; 415/43
[58] Field of Search ........................ 415/15, 18, 42, 43; 318/614, 626; 137/625.64, 596.16

[56] References Cited

U.S. PATENT DOCUMENTS

| | | | |
|---|---|---|---|
| 1,620,527 | 3/1927 | Emmet | 415/43 |
| 1,962,942 | 6/1934 | Seeley | 415/42 |
| 3,452,258 | 6/1969 | Thompson | 415/15 |
| 4,025,222 | 5/1977 | Hedstrom | 415/43 |
| 4,159,445 | 6/1979 | Lee | 318/614 |

Primary Examiner—L. J. Casaregola
Attorney, Agent, or Firm—Burns, Doane, Swecker & Mathis

[57] ABSTRACT

A multiple-purpose, closed-loop, automatic control system is disclosed, having a system controlled, and means for detecting a controlled variable output from the system controlled and for converting the controlled variable into an electrical feedback signal. The system further includes signal converting means for receiving the feedback signal and for converting the signal into an angular displacement corresponding to the feedback signal; means for comparing the controlled variable with a preset desired value and for selectively opening or closing a forward or reverse controlling circuit; and controlling means for automatic control over the system controlled to keep the controlled variable within the preset desired value. The controlling means includes the forward and the reverse controlling circuits selectively opened or closed by the comparing means, a braking control circuit and a driving mechanism responsive to the forward and reverse control circuits and the braking control circuit. The driving mechanism includes a fluid-type electromagnetic pilot valve mechanism having a piston rod, and includes a solenoid at each end of the piston rod. The solenoids are selectively energized by the forward and reverse controlling circuits such that the piston rod is selectively moved in order to change the direction of flow of the fluid through the pilot valve.

9 Claims, 15 Drawing Figures

MULTIPLE-PURPOSE CLOSED LOOP AUTOMATIC CONTROL SYSTEM

This is a division of application Ser. No. 823,462, filed Aug. 10, 1977, now U.S. Pat. No. 4,250,440.

FIELD OF INVENTION

The present invention relates generally to multiple-purpose feedback control systems and more particularly to an automatic control system which can be used to control industrial machinery, equipment and devices with a high degree of precision and reliability.

BACKGROUND OF INVENTION

Automatic control systems of the electronic, hydraulic and pneumatic types have long been used in industry. However, conventional automatic control systems of the pneumatic or the hydraulic type have many inherent drawbacks, such as: short signal transmittal distance; transit time delays associated with signal transmission; piping being required for signal transmission; few physical variables which can be measured; difficulty in calculating performance; and the high cost of instrumentation, to name but a few. The electronic type of automatic control system can overcome most of these drawbacks. For instance, the signal transmittal distance can be rather long for electronic type systems; such systems have almost no transit time delays; conducting wiring can be used for signal transmission; many physical variables can be measured; performance calculations can easily be made and instrumentation is relative low in cost. These advantageous characteristics, therefore, makes the electronic type of automatic control system most desirable.

However, due to the complexity in wiring of electronic automatic control systems problems frequently occur. Additionally, some of the failures are not predictable and therefore preventative measures are sometimes impossible. Moreover, some troubles are undetectable and thus repair is difficult and the reliable of the system is low. Still further, owing to the difficulties in manufacture, operation and maintenance, the cost of such systems are high. And, since the electric motors generally used in such systems usually have a weak driving force and a low speed, electronic automatic control means cannot be widely adopted.

SUMMARY OF INVENTION

Therefore, the main object of the present invention is to provide a multiple-purpose automatic control system for use in automatic regulation, process control and servo-mechanisms of various systems which are to be controlled.

Another object of the present invention is to provide a multiple-purpose automatic control system that can exert effective automatic control over physical variables of a system which is to be controlled, such as revolution speed, linear speed, torque, output force, power, voltage, current, frequency, flow rate, temperature, pressure, liquid level, linear and angle displacement, and so forth.

Another object of the present invention is to provide a multiple-purpose automatic control system wherein the variation of current, of the direction of a reversible electric motor, of pneumatic pressure, or of hydraulic pressure can be used as a power medium to achieve an effective automatic control.

Still another object of the present invention is to provide a multiple-purpose automatic control system capable of long distance signal transmitting without transit time delays.

A further object of the present invention is to provide a multiple-purpose automatic control system that is durable, trouble-free, simple to wire and construct, reliable, low cost and easy to manufacture, operate and maintain and which uses a reversible electric motor, or pneumatic or hydraulic pressure the power medium.

A still further object of the present invention is to provide a multiple-purpose automatic control system wherein the components are simple and readily available.

A still further object of the present invention is to provide a multiple-purpose automatic control system having good stability, quick response, high precision and which can be used to control a wide range of systems.

Other objects and features of the present invention will become apparent through the following detailed description to be taken in conjunction with the annexed drawings.

DETAILED DESCRIPTION OF THE PREFERRED EMBODIMENTS

Figure 1:
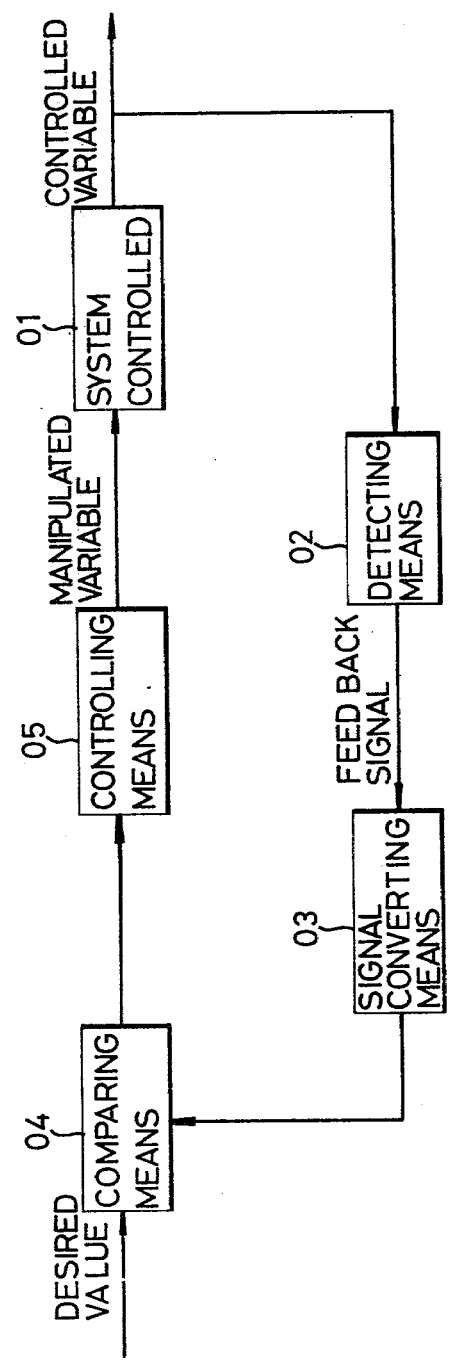
FIG. 1 is a block diagram depicting generally a basic feedback control system.

FIG. 1 is a basic block diagram depicting a feedback automatic control system comprising a system controlled 01, detecting means 02, signal converting means 03, comparing means 04 and controlling means 05. A controlled variable or output from the system controlled 01, in the form of electric current, is detected by the detecting means 02, and converted by the converting means 03 into a physical quantity having a certain relationship with the controlled variable. This quantity is then fed back to the comparing means 04 where it is compared with a preset desired value, and their difference is transformed into an input signal or actuating signal. The input signal is fed to controlling means 05 and transformed into a manipulated variable which is used to control the system controlled 01 and adjust the controlled variable to meet with the desired value.

Figure 2:
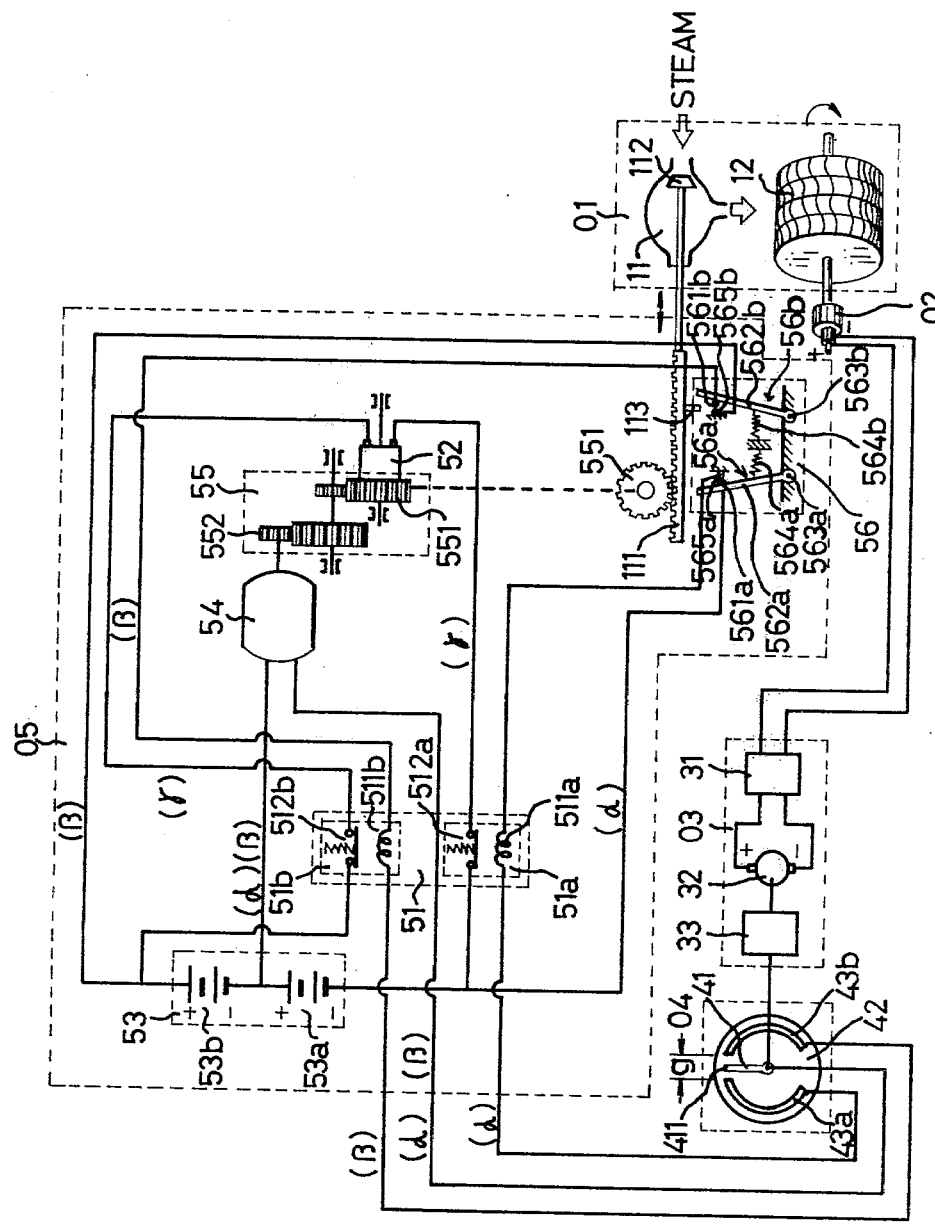
FIG. 2 is a schematic diagram depicting an automatic control system according to the present invention.

The basic construction of the embodiment of the present invention depicted in FIG. 2 comprises all the five fundamental elements shown in FIG. 1, except that the comparing means 04 and the controlling means 05 of this embodiment bear some specific features which are detailed below.

In this system, the controlled variable output from the system controlled 01 after being detected by the detecting means 02 is fed back to the signal converting means 03 in the form of an electric current. This current is in turn amplified by amplifying means 31 and fed to a balancing motor 32 which converts the amplified current signal into the physical quantity of rotary movement. The rotary movement is transmitted through reducing gear means 33 to a rocker arm 41 of a control switch 04 of the comparing means and causes the rocker arm 41 to rotate through an angle corresponding to the variation of the controlled variable. After comparing with the desired value, the deviated signal is utilized as a controlling signal to control the contact point of control switch 04. Then the circuit of controlling means 05 functions to control the driving mechanism 54 (reversible electric motor in the present embodiment) by controlling the connection of a power source 53 to the driving mechanism through the use of relay 51 and braking means 52. This permits the driving mechanism to rotate forwardly or reversely or to stop, and thereby effects feedback control through a reducing gear means 55 driven by the said driving mechanism 54 and automatically adjusts the controlled variable toward the desired value. To avoid the movement of controlling means, exceeding the preset controlling limit, safety means 56 is provided in the controlling means 05 to control the movement of the driving mechanism.

More substantially, this control system can be used to automatically control the rotational speed of a steam turbine. In such a system the detecting means 02 is adapted to a tachometer generator connected to the output shaft of the seam turbine 01. The controlled variable (output) from the system controlled 01 after being detected through the techometer generator 02 is converted into an electric feedback signal which is fed to signal converting means and amplified. The amplified signal is then fed into the small balancing motor 32 to cause rotation corresponding to the detected quantity.

When motor 32 starts rotating, the reducing gear set 33 connected thereon drives the rocker arm 41 which serves as the control switch of comparing means 04. The arm 41 selectively closes the control switch 04.

The said control switch 04 comprises a rocker arm 41, an insulating disc 42 and a pair of arc shaped conductor 43a, 43b symmetrically disposed on disc 42. The rocker arm 41 as afore-mentioned is connected to the output shaft 331 of the reducing gear means 33. At the front end of arm 41, an electric contacting point 411 is fixed thereon with insulating material imposed there between. The point 411 is rotated with arm 41 and slides on the disc between conductors 43a and 43b. The gap g located between conductors 43a and 43b is an insulating material having the same cross section as conductors 43a, 43b and forming a circular track with the conductors 43a and 43b on disc 42 to facilitate a smooth and continuous movement of the controlling point 411 to move with gap g as a center toward left or right to conductor 43a or 43b. One end of conductor 43a, 43b, is respectively led to a pair of relays 51a, 51b of the controlling means 05, and point 411 of rocker arm 41 is led to reversible electric motor 54.

Controlling means 05 comprises relay 51, electromagnetic braking means 52, power supply 53, driving mechanism 54, reducing gear means 55 and safety means 56.

Relay 51 comprises a pair of relay 51a and 51b having contact point 512a and 512b respectively which are respectively controlled by electromagnetic coil 511a and 511b. Coils 511a and 511b each having one end connected to arc shape conductors 43a, 43b as aforementioned, and the other end to safety switch 56a, 56b. Contact point 512a, 512b of the relay 51a, 51b are connected to positive and negative poles of power supply (Battery) 53a, 53b, and to positive and negative terminals of electromagnetic braking means 52.

Driving mechanism 54 of this embodiment is a reversible DC electric motor as aforementioned, which rotates forwardly or reversely in response to changes in the direction of current flow. Positive and negative poles of the motor 54 are connected to rocker arm 41 and to the middle point of two series connected power supplies 53a and 53b respectively. The output shaft of motor 54 is connected to a reducing gear means 55 which is composed of a train of gears. The last gear 551 of the train controls the system controlled 01 through an appropriate follower mechanism. In the present embodiment, gear 551 is in mesh with a rack 111 of a steam regulating valve 11 and a valve plug 112 is disposed at one end of the rack 111. The rotating speed of steam turbine 12 is governed by adjusting the steam inlet through the regulation of plug 112. Such regulation is made possible by moving rack 11 forewardly or rearwardly through the use of gear 551.

Safety means 56 comprises two safety switches 56a, 56b, for controlling the opening and closing of the controlling circuit. When rack 111 surpasses preset limits a power supply is cut off in order to stop the action of controlling means 05. The safety switches 56a or 56b may be installed at appropriate location of the system controlled 01 or provided at two ends of the variable resistor in the main controlling means which will be described below. In the present embodiment, the safety switch pair 56a, 56b is placed adjacent rack 111. An actuating bar 113 is disposed on the rack 111 and between the switch pair 56a, 56b. Said safety switches 56a, 56b have respectively an insulated moveable arm 562a, 562b with contacting points 561a, 561b included on the arm tips. The arms 562a, 562b are pivotly mounted on pivot center 563a, 563b and biased by springs 564a, 564b, respectively. The contacting points 561a and 561b are in contact with corresponding fixed contact points 565a, 565b. Yet when rack 111 is driven by gear 551 to surpass preset limits, actuating bar 113 contacts either arm 562a or 562b and causes the departure of point 561a (or 561b) from point 565a (565b) thus opening the controlling circuit. As motor 54 stops rotating, rack 111 comes to a standstill and the regudating valve stays at a safety position to protect the machine from being damaged. Contact points 561a, 561b are connected with power supply 53a, 53b respectively, and points 565a, 565b are connected with coil 511a, 511b respectively.

An electromagnetic braking means 52 is provided at the last gear 551 of the reducing gear set 55 to brake the said gear set 55, in order to control the stopping of the rotation of motor 54. The electromagnetic braking means is connected between contact points 512a and 512b of relay 51a, 51b. When the controlled variable meets with desired value, the electromagnetic brake means will act on the reducing gear 551. When the controlled variable departs from the desired value either the relay 51a or 51b is energized thereby leaving open the contact point 512a, or 512b, an thus the braking means fails to act. Consequentially, the reducing gear set 55 and motor 54 are free to rotate. The electromagnetic braking means may be disposed at the electric motor also.

Figure 3:
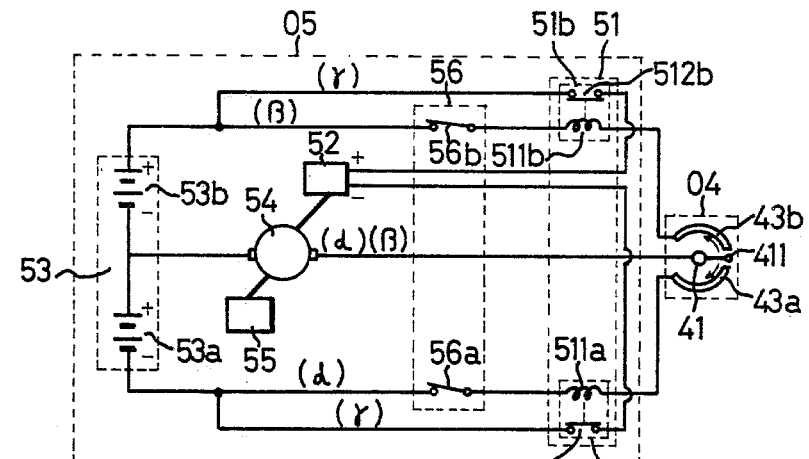
FIG. 3 is the main circuitry of the automatic control system depicted in FIG. 2.

The controlling circuit of the abovesaid system is shown in FIG. 3. A forward rotation controlling circuit (α) of motor 54 is composed of power supply 53a→motor 54→point 43a→coil 511a of relay 51a→safety switch 56a→power supply 53a as the direction of current flow. A reverse rotation controlling circuit (β) of motor 54 is composed of power supply 53b→safety switch 56b→coil 511b of relay 51b→point 43b of control switch 04→motor 54→power supply 53b as the direction of current flow. A braking controlling circuit (α) of motor 54 is composed of power supply 53b→point 512b of relay 51b→electromagnetic braking means 52→point 512a of relay 51a→power supply 53a→power supply 53b.

Figure 4:
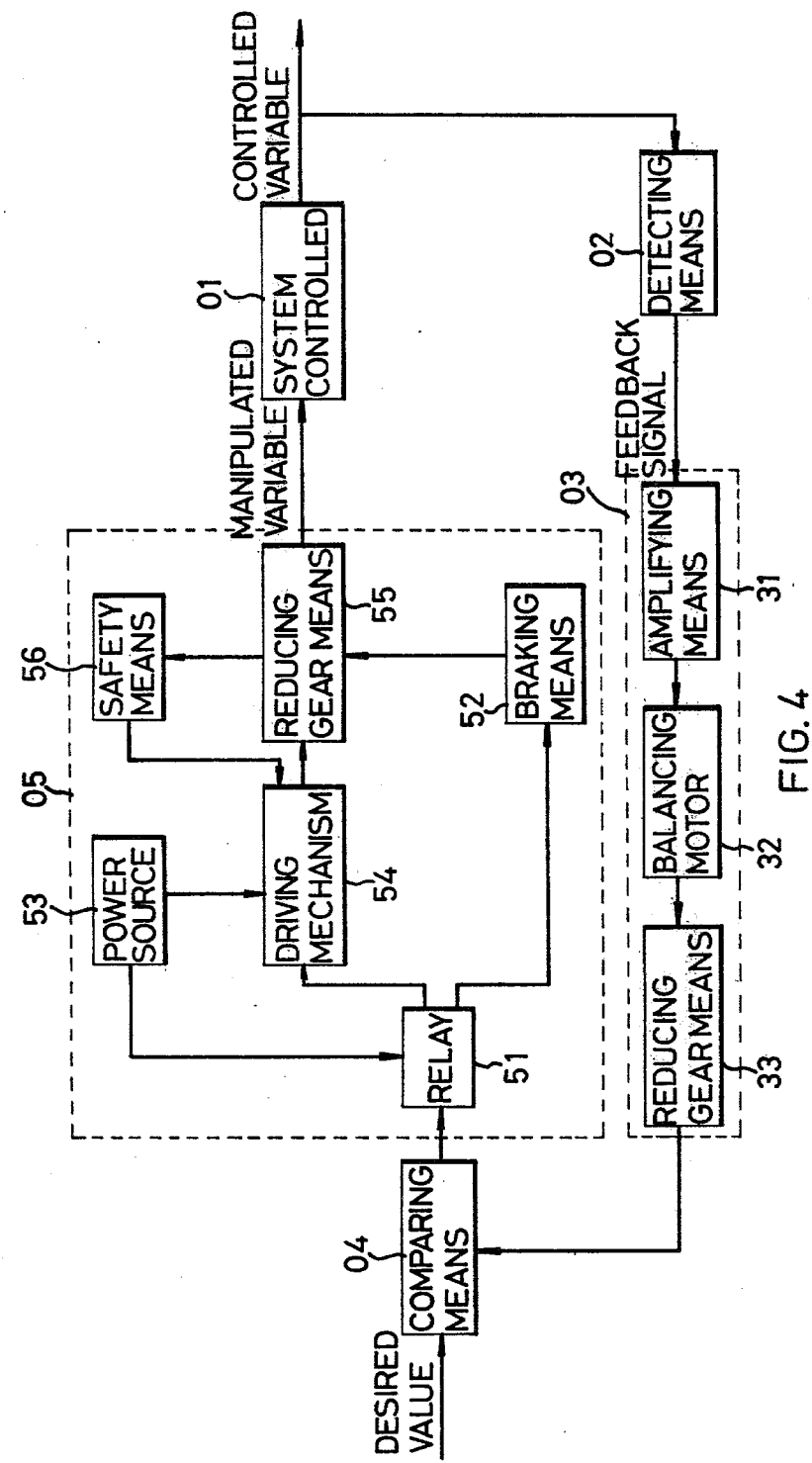
FIG. 4 is a block diagram of the automatic control system depicted in FIG. 2.

FIG. 4 is a block diagram depicting an embodiment of the present invention, wherein the driving mechanism is a reversible motor 54, and control of system controlled is effected through a reducing gear set 55. Now referring to FIG. 2 and FIG. 4 for a detailed description of the operation:

The controlled variable (rotating speed in this embodiment) output from system controlled 01 is detected through detecting means 02 and the signal is fed back to converting means 03 in a form of electric current. When the controlled variable becomes higher or lower than the desired value, the signal varies correspondingly. After amplified by the amplifier 31, the signal is fed to balancing motor 32 and converted into rotating movement. The movement of motor 32 is transmitted to rocker arm 41 of comparing means 04 after its speed has been reduced by the reducing gear set 33. The rocker arm 41 in turn rotates toward the left or the right depending on the signal detected. The contacting point 411 at front end of arm 41 departs from the gap g to contact with arc shape conductor 43a or 43b thereby closing either the motor forward rotation controlling circuit (α) or reverse rotation controlling circuit (β). In the meantime, since the relay 51a or 51b is energized to open the contact point 512a or 512b, the braking controlling circuit (α) is opened and the electromagnetic braking means 52 will not act on the last gear 551. Motor 54 is capable of driving the reducing gear means 55 with the last gear 551 thereof to effect corresponding regulation over the steam regulating valve 11, which forces the rotating speed of the steam turbine in the system controlled 01 to reach the desired value.

Once the controlled variable reaches the desired value, through detection and conversion by detecting means 02 and converting means 03, the contacting point 411 of the rocker arm 41 of control switch 04 departs from contacting with conductor 43a or 43b and returns to the position in gap g. The control switch 04 opens thus causing the motor forward rotation controlling circuit (α) or reverse rotation controlling circuit (β) to open, thereby causing the motor 54 to stop rotating. In the meantime relay 51a, 51b is de-energized, point 512a, 512b is closed, and therefore the motor braking controlling circuit (γ) is closed. Electromagnetic braking means 52 acts on the reducing gear means 55 and the motor 54 is braked effectively. Regulating valve 11 is maintained at an most appropriate position to keep the controlled variable of the system controlled within a preset desired value.

Since the allowable limits of variation of the controlled variable is determined by the gap g between conductors 43a and 43b, this gap is arbitrarily selectable. The action of the control switch opening or closing the circuit is very sensitive and accurate; therefore the control of the controlled variable within a preset desired value is effected quickly and precisely.

Figure 5:
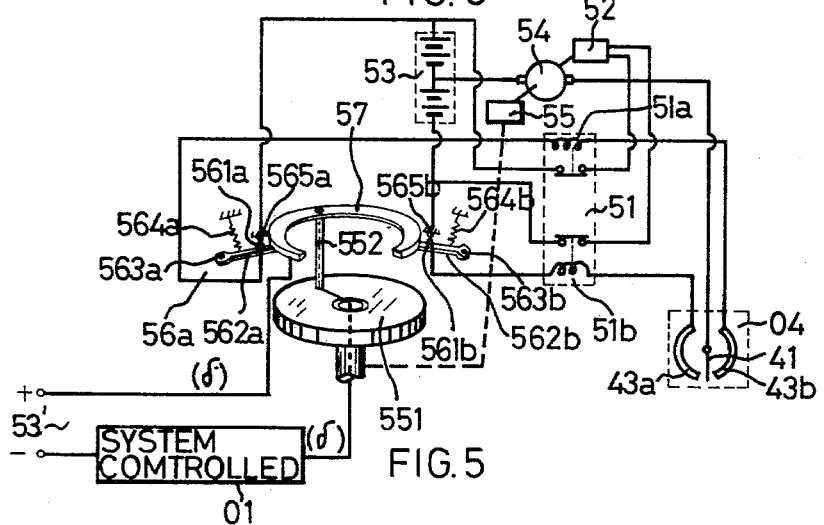
FIG. 5 is a schematic diagram depicting an automatic controlled system according to the present invention wherein a variable resistor is included.

In another embodiment of the present invention depicted in FIG. 5, a circular variable resistor 47 with an opening is provided at the output end of the reducing gear means 55. Last gear 551 of the reducing gear means 55 is provided with a rod 552 which has its upper contact point electrically connected to the resistor 57. When the gear 551 rotates forwardly or reversly, the rod 552 with its contact point slides along the variable resistor 57 thereby correspondingly varying the resistance between the contact point of rod 552 and the terminal of resistor 57. The current in a control circuit (δ) which is composed of another power supply 53'→variable resistor 57→contacting rod 552→system controlled 01→power supply 53', varies correspondingly and is fed back to control the system controlled.

Figure 6:
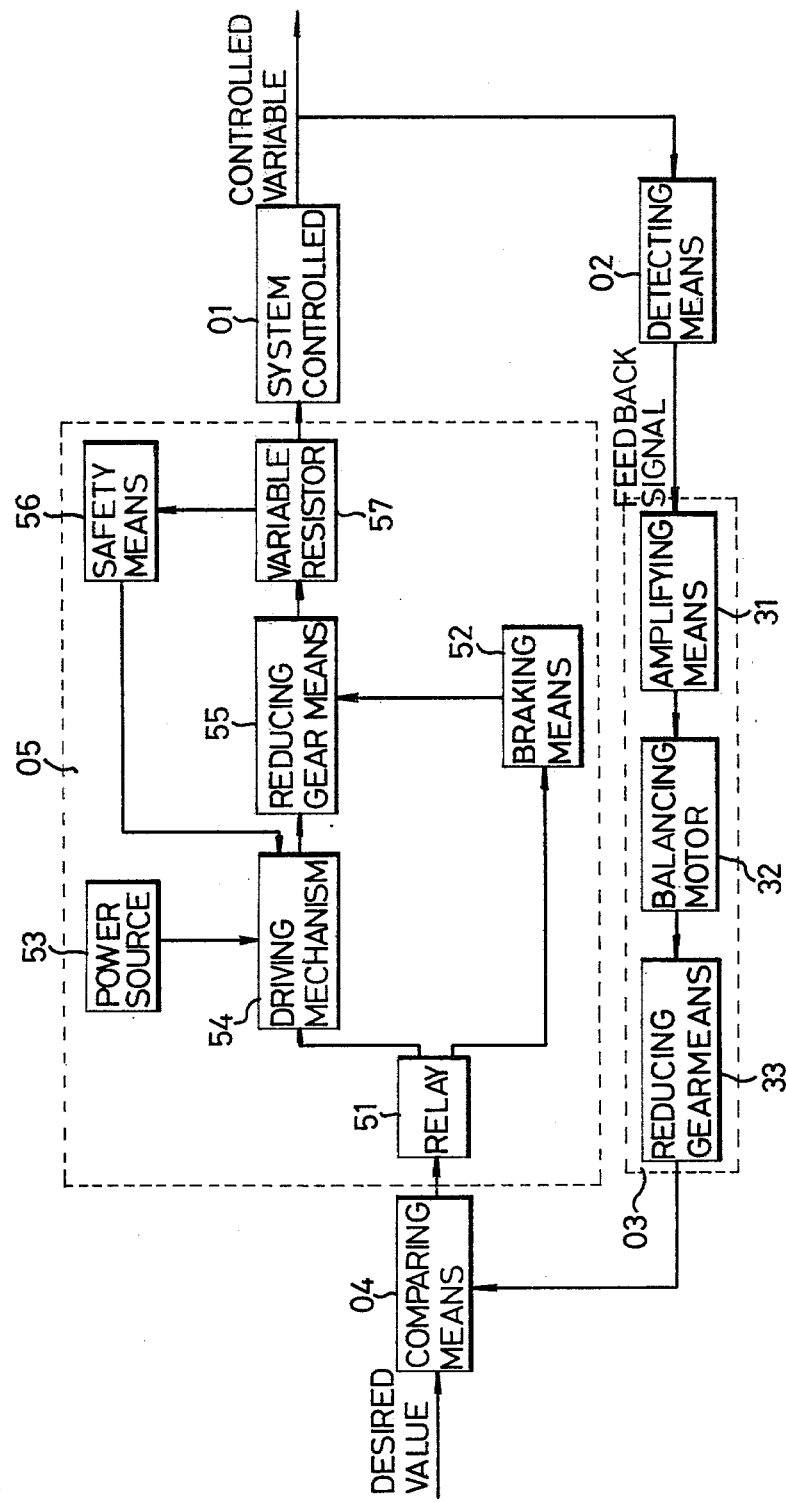
FIG. 6 is a block diagram of the automatic control system depicted in FIG. 5.

In this embodiment, safety switches 56a, 56b are disposed at two terminals of the variable resistor 57. When contacting rod 552 surpasses the preset movement limits, i.e. the high/low limits of resistor 57, rod 552 contacts the movable arm 562a or 562b, and causes point 561a or 561b to depart from point 565a or 565b. Control circuit (α) or (β) as shown in FIG. 2 is then opened and in the meantime braking circuit (γ) is closed to effect braking and to stop the controlling function of the controlling means 05. Once the controlling function is stopped, contacting rod 552 stays at a position where movable arm 562a or 562b is located without surpassing either terminal of the resistor 57 and thus the safety of whole controlling means is assured. FIG. 6 is a block diagram of such an automatic control system.

In the above embodiments, a reversible DC motor was used as the driving mechanism 54 of the controlling means 05. However, it is known to those skilled in the art that an AC motor may also be used for this same purpose.

While the foregoing embodiments have employed a reversible motor as the driving mechanism, a pilot valve using a hydraulic or pneumatic working medium incorporated with a cylinder or diaphragm valve may also be used. FIGS. 7 to 10 depict embodiments using such a hydraulic or pneumatic mechanism.

Figure 7:
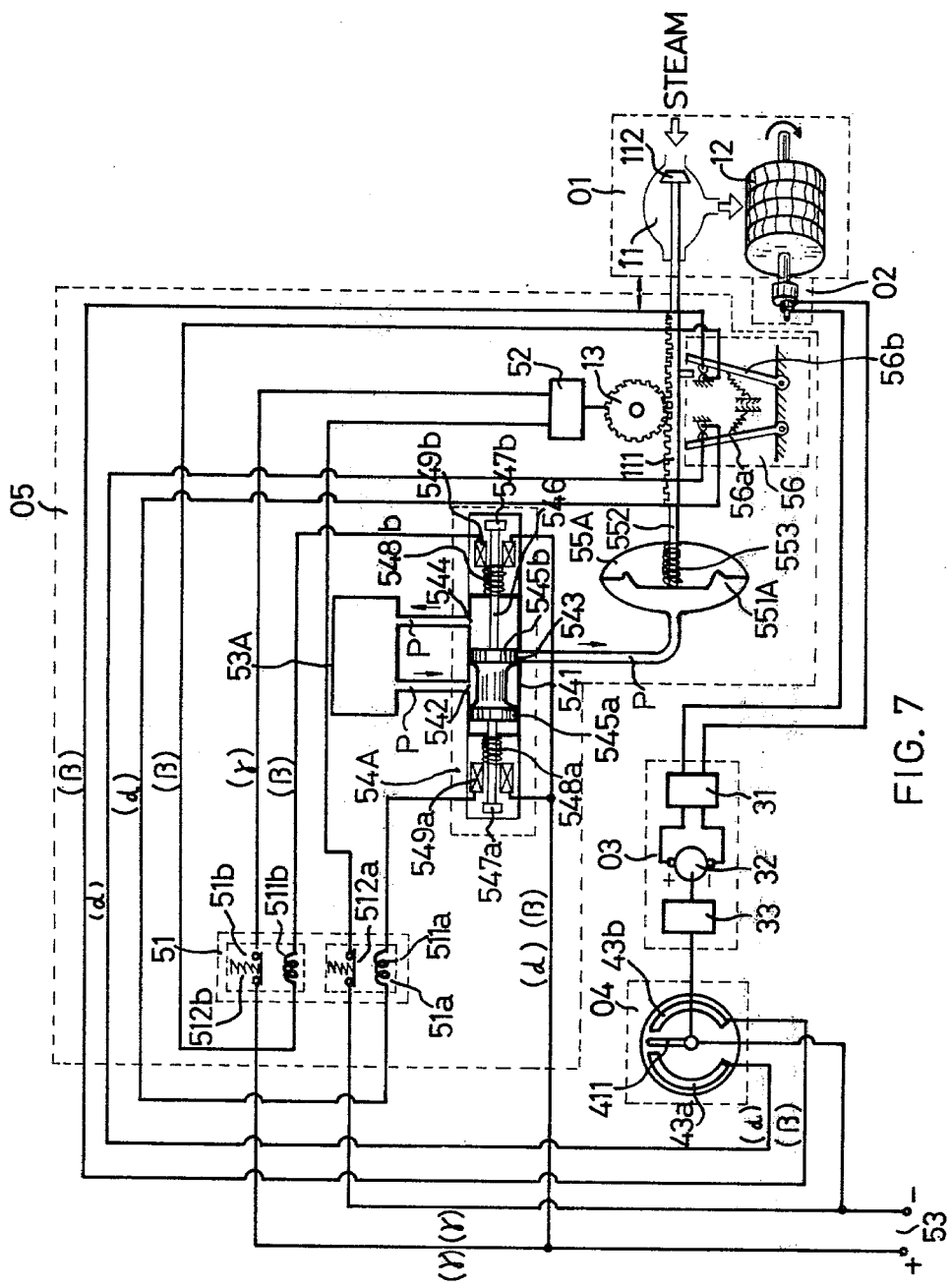
FIG. 7 is a schematic diagram depicting an automatic control system according to the present invention wherein hydraulic means are employed.

With reference to FIG. 7, control is effected through a pilot valve in cooperation with a diaphragm valve. The same reference numericals are used to represent equivalent elements appearing in former embodiments. Duplication of description is therefore not warranted.

For the convenience of illustration, system controlled 01 in this embodiment is still a steam turbine. The main exception is the adopting of an electromagnetic pilot valve 54A using hydraulic or pneumatic medium instead of reversible electric motor 54 in the controlling means 05, and diaphragm valve 55A to replace the reducing gear means 55.

The said pilot valve 54A comprises a valve body 541 with a fluid inlet 542, an outlet 543 and a fluid return 544. Slidably contained within the valve body 541 is a piston rod 546 fixed with a pair of pistons 545a and 545b in the middle section. Heads 547a, 547b are fixed at two ends of the rod 546. Return springs 548a, 548b are provided between said heads 547a, 547b and the ends of the valve body 541. Solenoids 549a, 549b are located at two ends of valve body 541. When the pilot valve 54A is inactive, piston 545b closes the fluid outlet 543. Another piston 545a serves to balance the pressure. When solenoid 549b is energized owing to the attraction force of solenoid 549b and head 547b, the piston rod 546 is attracted to open the outlet 543, thereby connecting the inlet 542 and outlet 543. When solenoid 549a is energized, the piston rod is attracted to cause connection of outlet 543 and fluid return 544.

Said fluid inlet 542 and fluid return 544 are connected respectively through conduit P to the high pressure side and low pressure side of a hydraulic pressure source 53A. Outlet 543 is connected through conduit P to the input side of a diaphragm valve 55A having a diaphragm 551A. The output side of the diaphragm valve 55A is connected to an actuating rod 552 having a return spring 553 provided thereon. The rack 111 is connected at the end of rod 552 and governs steam flow through steam regulating valve 11 of system controlled 01. Rack 111 is meshed with a braking gear 13 which is provided with an electromagnetic braking means 52. Safety means 56 having switches 56a and 56b is disposed at an appropriate positions related to rack 111.

One end of solenoids 549a and 549b are connected to the electromagnetic coils 511a', 511b' respectively, and the other ends are connected to power supply 53. The circuit is shown in FIG. 8 and the block diagram of the control system is shown in FIG. 9.

Figure 10:
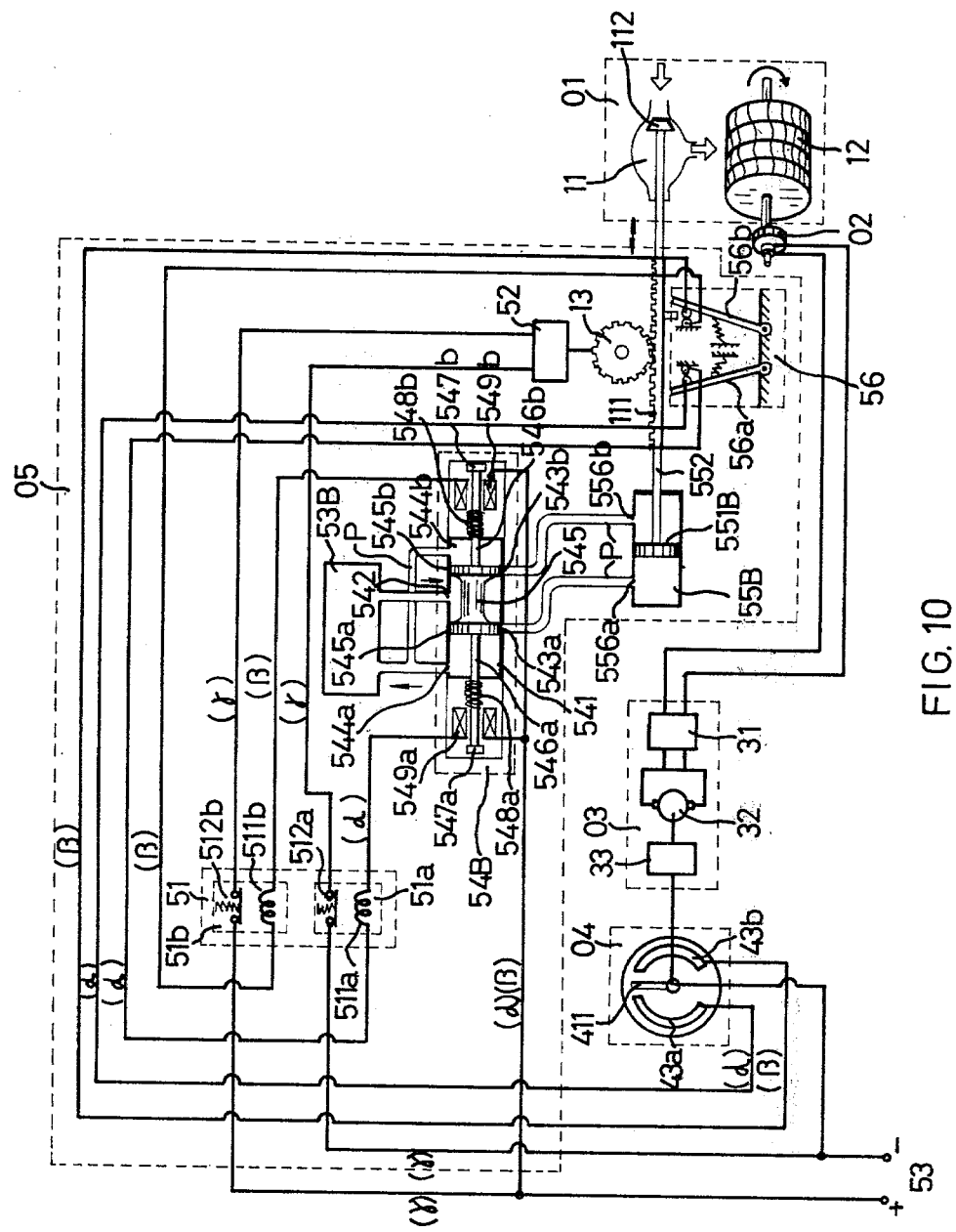
FIG. 10 is a schematic diagram depicting still another embodiment of the automatic system according to the present invention wherein hydraulic means are employed.

FIG. 10 depicts another embodiment using a pilot valve for control of the system controlled. In this embodiment, the pilot valve 54B comprises a valve body 541 with one fluid inlet 542, two outlets 543a, 543b and two fluid returns 544a, 544b. Slidably contained in the valve body 541 is a piston rod 546 having at its middle section a pair of pistons 545a, 545b. Head 547a, 547b is fixed at each of the two ends of the rod 546. Return springs 548a, 548b are provided between said head 547a, 547b and the ends of the valve body 541, and solenoids 549a and 549b are located respectively at two ends of valve body 541 to control the opening or closing of fluid outlet 543a, 543b through the rod 546. When the solenoids 549a and 549b are not energized owing to the force of return springs 548a, 548b, pistons 545a, 545b close the outlet 543a, 543b, respectively. When solenoid 549a is energized the piston rod 546 is attached thereby opening fluid outlet 543a; when solenoid 549b is energized, outlet 543b is opened.

Outlets 543a, 543b are connected through conduit respectively to fluid openings 556a, 556b of a cylinder 55B. The cylinder 55B has a piston 551B with piston rod 552B which is connected to a rack 111 of steam regulating valve 11 as aforementioned. The rack 111 is meshed with a braking gear 13 of an electromagnetic braking means. Said fluid inlet 542 and the two fluid returns 544a, 544b are connected to hydraulic pressure source 53B.

Figure 8:
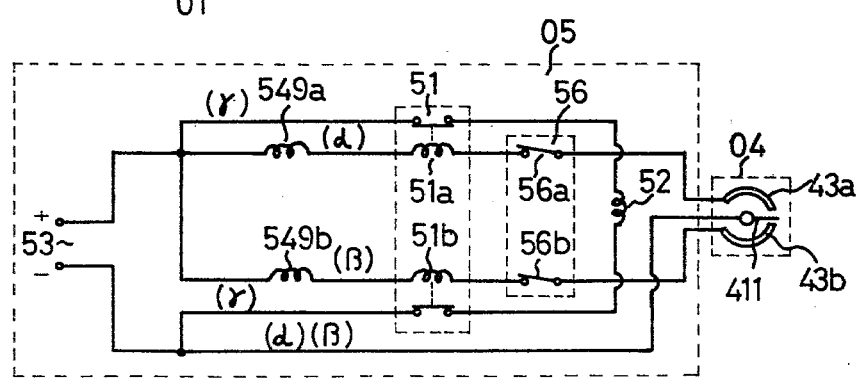
FIG. 8 is the main circuitry of the automatic control system depicted in FIG. 7.
Figure 9:
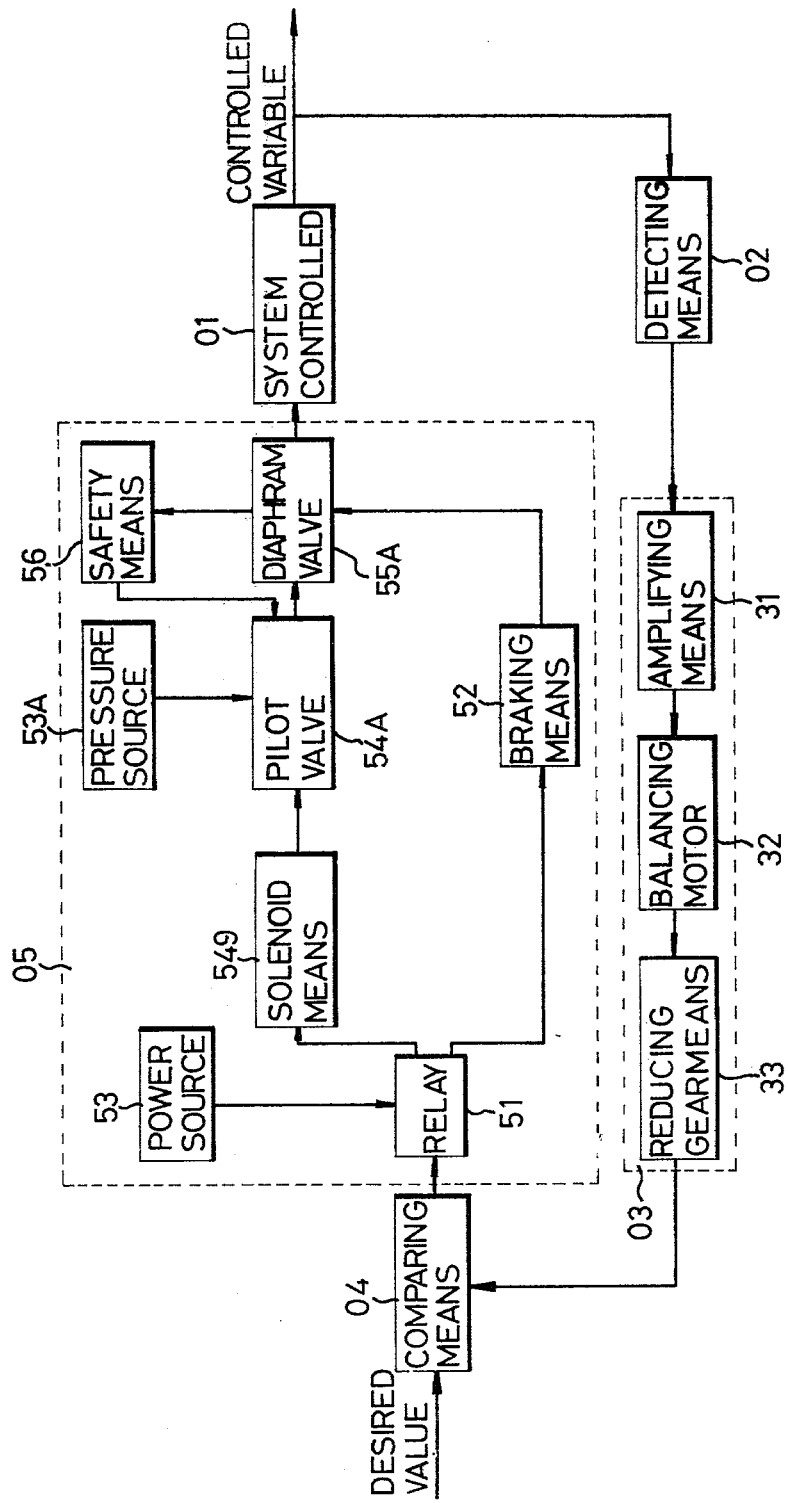
FIG. 9 is a block diagram of the automatic control system depicted in FIG. 7.

Circuit of this embodiment is same as that of the embodiment in FIG. 8. The block diagram of the system is shown as in FIG. 11.

Details of operation of the control system using the hydraulic pilot valve is as follows:

The controlled variable output from the system controlled 01 is detected by detecting means 02 and fed back to converting means 03 in the form of an electric current. The feedback signal is amplified by amplifier means 31 and fed to a balancing motor 32 to produce a rotary movement. The movement is transmitted through reducing gear means 33 to the rocker arm 41 of comparing means 04 thereby rotating the rocker arm through an angle corresponding to the detected signal. When the controlled variable becomes higher or lower than the desired value, contact point 411 of rocker arm 41 contacts conductor 43a or 43b. A forward movement circuit ($\alpha$) composed of power supply 53→rocker arm 41 of control switch→conductor 43a→safety switch 56a→coil 511a of relay→controlling solenoid 549a of pilot valve→power supply, or a reverse movement circuit ($\beta'$) composed of power supply 53→controlling solenoid 549b of pilot valve→coil 511b of relay→safety switch 56b→conductor 43b→rocker arm 41 of control switch→power supply 53 is closed. In the meantime, a braking controlling circuit ($\gamma'$) composed of power supply 53→point 512a of relay→electromagnetic braking means 52→point 512b of relay→power supply is opened.

Due to the attractive force of solenoid 549a, 549b with head 547a, 547b, the piston rod 546 shifts to the left or the right. For the embodiment shown in FIGS. 7 through 9, the position change of the piston rod 546 causes the connection of fluid inlet 542 with outlet 543, or the connection of fluid outlet 543 with fluid return 544 of the pilot valve 54A. Hydraulic or pneumatic pressure is transmitted from the source 53A into the diaphragm valve 55A, causing the diaphragm 551A to expand against spring 553 and force the rack 111 forward, or return the fluid from diaphragm valve 55A through outlet 543 to hydraulic or pneumatic pressure source 53A, and force the rack 111 backward by the force of spring 553, to effect corresponding regulation of the steam regulation valve 11 which in turn controls the controlled variable to stay within desired value.

Figure 11:
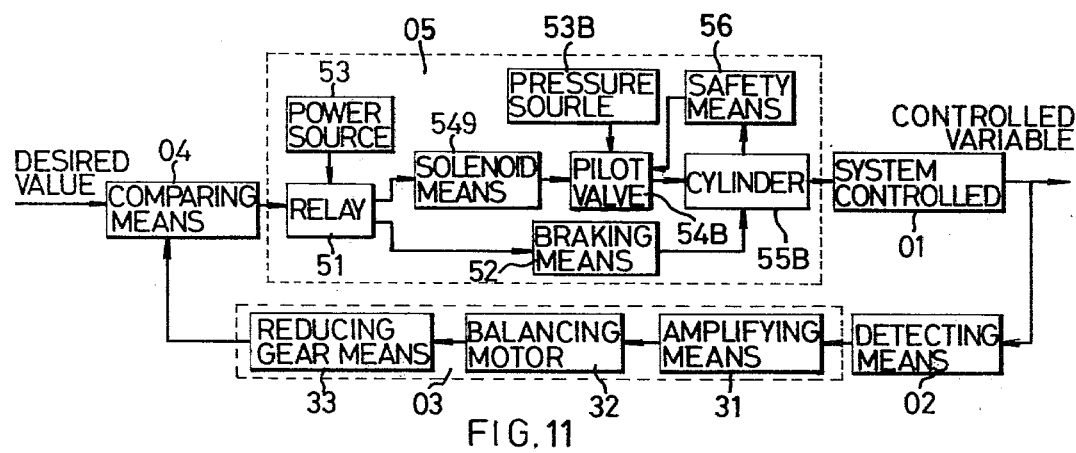
FIG. 11 is a block diagram of the automatic control system depicted in FIG. 10.

For the embodiment shown in FIGS. 10 and 11, due to the position change of piston rod 546, fluid inlet 542 of the pilot valve 54B is connected to outlet 543a, and outlet 543b is connected to fluid return 544b; or inlet 542 is connected to outlet 543a and outlet 543b is connected to fluid return 544a. Then the hydraulic or pneumatic pressure is transmitted from source 53B through pilot valve 54B and fluid opening 556a to one end of the cylinder, forcing piston 551B forward. In the meantime, low pressure fluid at the other end of piston 551B flows from fluid opening 556b through pilot valve 54B and returns to the source 53B. Or the hydraulic pressure is transmitted from the source 53B through pilot valve 54B and fluid opening 556b to the other end of cylinder 55B to cause backward movement of the piston 551B. In the meantime, low pressure fluid that formerly entered into one end of the cylinder 55B is returned to source 53B through opening 556a of cylinder 55B and pilot valve 54B to cause rack 111 to effect corresponding control over the system controlled 01 so as to keep the controlled variable within the desired value.

When the controlled variable reaches the desired value through the abovesaid regulation, the controlling point 411 of rocker arm 41 of control switch 04 departs from conductor 43a or 43b and returns to the insulated gap g; the control switch opens; both the forward movement circuit (α') and the reverse movement circuit (β') are opened; the piston rod 546 returns atuomatically to the middle position through the actions of springs 548a, 548b, thereby causing piston 545b in FIG. 7 or 545a and 545b in FIG. 10 to close respectively outlet 543 in FIG. 7 or 543a and 543b in FIG. 10. In the meantime, de-energization of relays 51a, 51b causes points 512a and 512b to respectively close, and the braking circuit (γ') is closed. Electomagnetic braking means 52 exerts its influence on braking gear 13, and the rack 111 fails to move under inertia or other causes. Thus accurate and effective control over the system controlled 01 is achieved.

Figure 12:
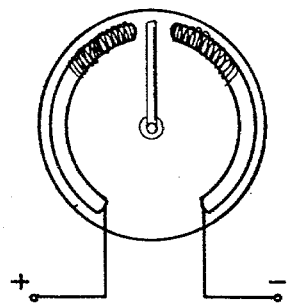
FIG. 12 is a schematic diagram depicting another embodiment of a control switch according to the present invention.

FIG. 12 depicts another embodiment wherein the control switch 04' is made in the form of a variable resistor. In other words, a portion of the entire resistor 43a', 43b' are substituted for the simple conductors 43a and 43b. When arm 41' rotates the current density passing through the forward movement circuit (α) or the backward movement circuit (β) varies corresponding to the angle of rotation, thereby varying the rotational speed of the reversible electric motor or the flow rate of the hydraulic or pneumatic pressure. This allows more precise control to be achieved.

Applications of the automatic control means of the present invention are numerous. The above embodiments illustrate controlling the revolution speed of a steam turbine. Embodiments for the control of electric current, voltage and temperature will now be detailed.

Figure 13:
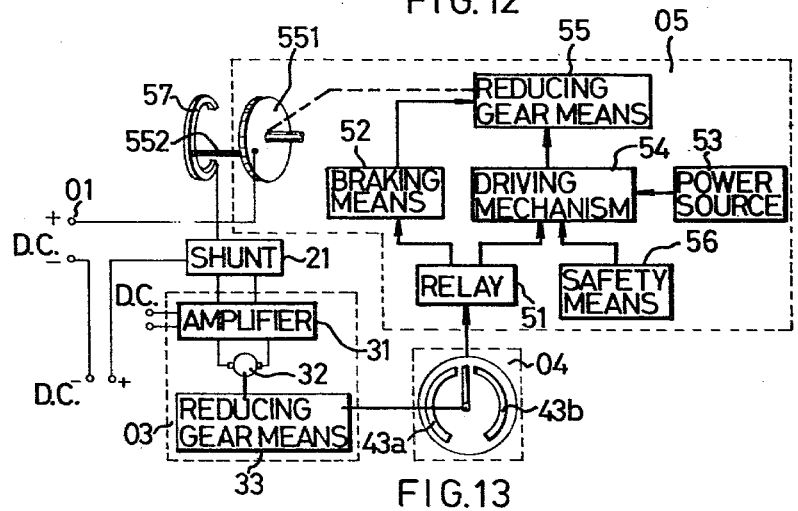
FIG. 13 is a schematic diagram illustrating an application of the present invention to current control.

FIG. 13 is a schematic diagram for the application of the present invention to the controlling of current. The same numerals are used to indicate the same or corresponding elements as aforementioned and details are also omitted. As shown in the drawing, the system controlled is a DC current which is used to perform work at a load after first passing through a variable resistor 57. When the input current becomes higher or lower than the desired value, the current passing through the shunt 21 also varies. The varying shunt current becomes the input signal to the comparing means 04. The said signal is amplified by amplifier 31 and then fed to the balancing motor 32 which in turn drives the rocker arm 41 of the control switch (comparing means) 04 through reducing gear means 33. Arm 41 rotates toward the left or the right to cause the current passing through the variable resistor 57 to be adjusted to an appropriate value. The relay 51 of controlling means 05, driving mechanism 54, electromagnetic breaking means 52 and reducing gear means 55 are used to automatically adjust the current passing through the variable resistor 57 (i.e. system controlled 01) to a desired value.

In this embodiment, variable resistor 57 of the original controlling means 05 becomes the system controlled 01, and shunt 21 becomes detecting means 02; amplifier 31, balancing motor 32 and gear 33 become signal converting means 03; control switch 04 becomes comparing means 04 and the rest the controlling means 05. FIG. 6 is the block diagram of this embodiment.

Figure 14:
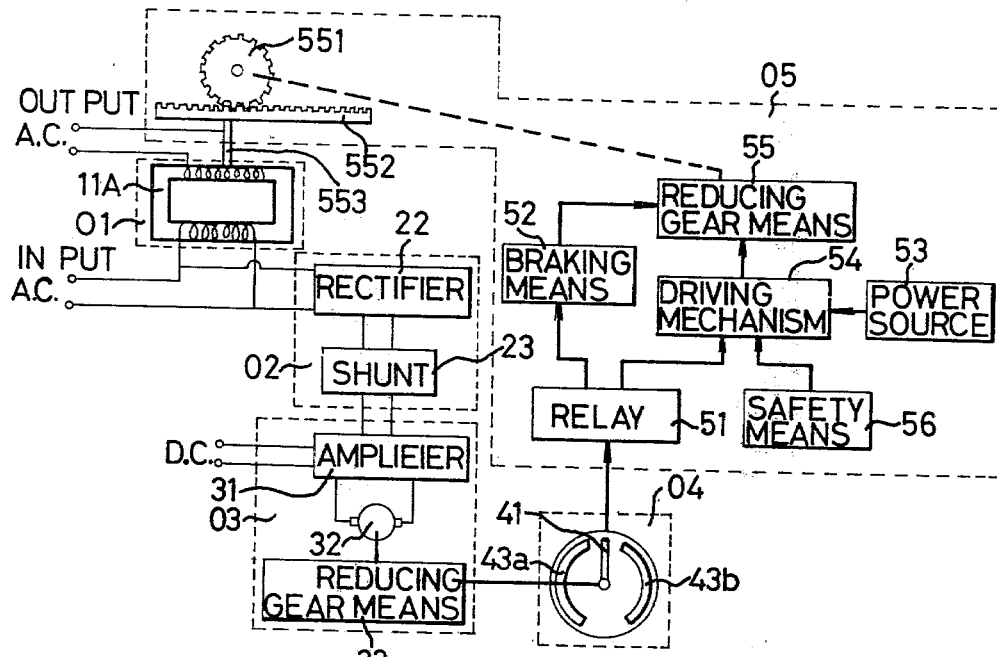
FIG. 14 is a schematic diagram illustrating an application of the present invention to voltage control.

FIG. 14 is a schematic diagram showing an application of the present invention to the controlling of voltage. When the input AC voltage to the system control 01 varies, the controlled variable is rectified by a rectifier 22 into a DC signal which is fed into signal converting means 03 and converted into a rotary movement. The rotary movement drives the rocker arm 41 of the control switch 04 and arm 41 rotates rocks correspondingly so as to close the forward movement circuit or backward movement circuit and to drive the rack 552 through driving gear 551 in controlling means 05. The rack 552 in turn moves the contacting rod 553 to vary the position of contact on the variable voltage regulator 11A. Current flowing through this regulator 11A varies correspondingly until the voltage resumes its desired value. In this embodiment, the voltage regulator becomes the system controlled, just like the steam valve 11 in the last embodiment. Detecting means 02 comprises rectifier 22 and shunt 23. Amplifier 31, balancing motor 32 and gear means 33 constitute the signal converting means 03. The control switch is the comparing means 04. Controlling means 05 consists of relay 51, electromagnetic braking means 52, reversible motor 54, reducing gear means 55, power supply 53 and safety switch 56. FIG. 4 is the block diagram of this embodiment.

Figure 15:
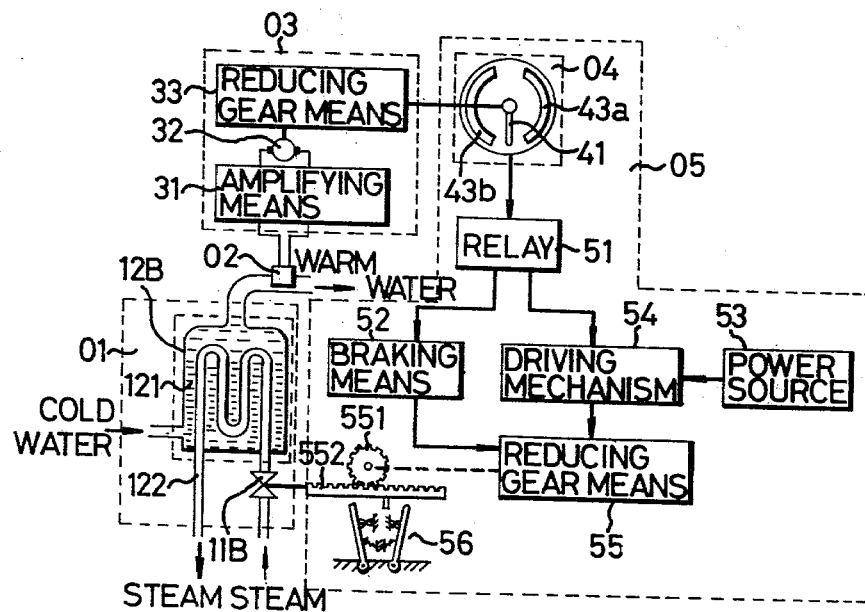
FIG. 15 is a schematic diagram illustrating an application of the present invention to temperature control.

FIG. 15 is an embodiment showing temperature control through the application of the present invention. The system controlled 01 comprises a steam regulating valve 11B, a heat exchanger 12B that includes a temperature regulating box 121 and a steam pipe 122. Said regulating valve 11B is disposed at the steam inlet of the steam pipe 122. The detecting means 02 is a potentiometer or thermo-couple located at the warm water outlet of the temperature regulating box 121. A signal converting means 03, a comparing means 04 and a controlling means 05 are provided as usual. The controlling means 05 also includes a last gear 551, a rack 552 and a safety switch 56.

After entering into heat exchanger 12B through an inlet thereof, the cold water absorbs the heat evolved from the steam pipe 122 to become warm water which is delivered through a warm water outlet. The temperature of the warm water is detected by the potentiometer or thermo-couple and turned into a current signal for use by converting means 03. The signal is converted into an angular displacement to drive the rocker arm 41 of the control switch 04 to close the forward controlling circuit (α) or backward controlling circuit (β). In the controlling means, the motion is transmitted through gear 551 and rack 552 to regulate the opening of the steam regulating valve 11B. The steam inlet is regulated to control temperature of the warm water delivered from the heat exchanger 12B to a preset desired value. FIG. 4 is the block diagram of this embodiment.

In the above applications, the driving mechanism 54 of controlling means 05 was illustrated as a reversible electric motor. However, the driving mechanism may be the driving mechanism shown in FIG. 7 or FIG. 10 which uses hydraulic or pneumatic pressure as a working medium. This is understandable and therefore need not be detailed.

The automatic control system of the present invention can employ a reversible electric motor, or a reversible hydraulic or pneumatic, electric, or magnetic pilot valve incorporated with a cylinder or a diaphragm valve to effect precise and effective control over such physical quantities as rotation speed, linear speed, displacement, torque, output force, power, voltage, current, frequency, flow rate, temperature, pressure, liquid level, and so forth with the advantages of simple operation, good stability, quick response, precise control, and rigidity of construction and ease of maintenance.

The principles, preferred embodiments and modes of operation of the present invention have been described in the foregoing specification. The invention which is intended to be protected herein, however, is not to be contrued as limited to the particular forms disclosed, since these are to be regarded as illustrative rather than restrictive. Variations and changes may be made by those skilled in the art without departing from the spirit of the present invention.

I claim:

1. A multiple-purpose, closed-loop, automatic control system comprising:
    a system controlled, said system producing as an output a controlled variable, and said system including a regulating means for selectively adjusting said controlled variable;
    detecting means for detecting the controlled variable output from the system controlled and for converting the controlled variable into an electrical feedback signal representative of said controlled variable;
    signal converting means for receiving the electrical feedback signal produced by said detecting means and for converting said signal into an angular displacement representative of the controlled variable, said signal converting means including a balancing motor for producing a rotary movement corresponding to said electrical feedback signal and means for converting said rotary movement into said angular displacement representative of the controlled variable;
    comparing means for receiving the angular displacement representative of the controlled variable produced by said signal converting means and for comparing the angular displacement representative of the controlled variable with an angular displacement representative of a preset desired value and selectively opening or closing a forward or a reverse controlling circuit; and
    controlling means for automatically controlling the system controlled so as to keep the controlled variable within the preset desired value, said controlling means including the forward and the reverse controlling circuit selectively opened or closed by said comparing means, a braking control circuit and a driving mechanism responsive to said forward and reverse controlling circuits and said braking control circuit,
        wherein said driving mechanism selectively operates the regulating means of the system controlled whenever the angular displacement representative of the controlled variable is not within the angular displacement representative of the preset desired value in order to selectively adjust said controlled variable, and
    further wherein said driving mechanism includes a fluid-type electromagnetic pilot valve mechanism having a piston rod, and includes a solenoid disposed at each end of said piston rod, said solenoids being selectively energized by said forward and reverse controlling circuits such that said piston rod is selectively moved in order to change the direction of flow of the fluid through the pilot valve.

2. The automatic control system according to claim 1 wherein said controlling means further comprises:
    a power supply for supplying energy to the driving mechanism;
    an electromagnetic braking means responsive to the braking control circuit for braking the movement of said driving mechanism;
    a pair of relays for controlling said electromagnetic braking means;
    a pair of safety switches capable of cutting off the forward and the reverse controlling circuit when the driving mechanism exceeds preset upper or lower controlling limits so as to assure safety of the control system;
    wherein a control circuit is formed between said comparing means and said forward controlling circuit to cause forward operation of the driving mechanism, said reverse controlling circuit to cause reverse operation of the driving mechanism, and said braking control circuit to effect immediate braking of the driving mechanism upon opening of the forward or reverse controlling circuit.

3. The automatic control system according to claim 2 wherein the power supply in the controlling means is compressed air.

4. The automatic control system according to claim 2 wherein the power supply in the controlling means is fluid under pressure.

5. The automatic control system according to claim 1 wherein said controlling means further comprises:
    a connecting member mechanically connected to selectively operate said regulating means;
    a cylinder member in fluid communication with said pilot valve mechanism; and
    a piston rod member included in said cylinder member and selectively moveable therein in response to changes in direction of fluid flow produced by said pilot valve mechanism, said piston rod member being connected to said connecting member such that movement of said piston rod member produces corresponding movement of said connecting member.

6. The automatic control system according to claim 1 wherein said controlling means further comprises:
    a connecting member mechanically connected to selectively operate said regulating means;
    a diaphragm valve mechanism in fluid communication with said pilot valve mechanism; and
    an actuating rod member connected to the diaphragm of said diaphragm valve mechanism such that said actuating rod member is selectively moved by said diaphragm in response to changes in direction of fluid flow produced by said pilot valve mechanism, said actuating rod member being connected to said connecting member such that movement of said actuating rod member produces corresponding movement of said connecting member.

7. The automatic control system according to claim 5 or claim 6:
    wherein said connecting member includes a rack; and
    wherein said controlling means further comprises:
        a braking gear, said braking gear being in mesh with said rack; and
        electromagnetic braking means connected to said braking gear and responsive to said braking control circuit for braking the movement of said rack.

8. The automatic control system according to claim 1 wherein said fluid-type pilot valve mechanism is a hydraulic-type pilot valve mechanism.

9. The automatic control system according to claim 1 wherein said fluid-type pilot valve mechanism is a pneumatic-type pilot valve mechanism.

* * * * *